UNITED STATES PATENT OFFICE
PTO – BOYERS, PA DUTY STATION

---

PAGE NOT AVAILABLE

PATENT NUMBER X92 FOR THE ISSUE DATE 1 / 16 / 1795 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing ALL Drawings

DATA CONVERSION OPERATION
BOYERS, PA

L16-1795

X 92

The Schedule referred to in these Letters patent, and making part of the same, containing a Description in the words of the said Jacob Perkins himself of an improvement in the mode of Manufacturing Nails &c A short and general description of Jacob Perkins's Invention. I have invented and discovered a mode of making Nails by which much manual labor may be saved by means of an [illegible], or revolutionary cutting Engine, and a Vulcan or heading Engine. The principle of the cutting Engine is that of a revolutionary motion i.e. a roller with 7 cutters fixed in it [illegible] the circumference of the roller apart, which passing by another die in a standard or plate, cuts or [illegible] off [illegible] may be placed between either of the dies on the roller; and the die in the plate, directly above which is an aperture or slit; sufficient for a piece of flat iron to pass thro' - the roller being turned in a skew shape tho' exceedingly true, acts also as a guide to the shifting plate, and brings it in that direction with each die in the roller, so as to cut up the whole strip of iron without any manual assistance, after it is once put in the aperture of the shifting plate - the heading Engine is worked by the revolution of a tappet wheel, having three tappets each of which lifts up a hammer, which gives three strokes each revolution of the wheel, on the nail which is fixed in a Vice directly under the hammer; the three strokes forming the head of the nail; there is also affixed to the tappet wheel, a piece in a curved form, which catching the tail of a lever forces the jaws of the vice ~~[illegible]~~ sufficiently firm for the purpose of heading it. when the curved piece ceases to operate on the Vice-lever, a spring pulls open the vice at the which time, and the tappets again reaching the tail of the lever, another nail is put in; the [illegible] nail dropping down immediately on the jaws of the Vice opening. It is to be observed one cutting Engine may with ease be drove by Water 250 revolutions in a minute each revolution produces 7 Nails & one Boy of ten or twelve years of Age can with ease supply six Engines so that the labor of one Boy can cut three thousand Nails [illegible] minute, the heading Engine will head sixty Nails [illegible] Minute, by the assistance of one Boy, or more if it is possible for the Boy to hand them. a more particular description of these Engines is given in the Specification accompanied with drawings and written references ~~[illegible]~~ presented And I the said Jacob Perkins do now [illegible] certify that this Schedule contains a short and general description of my invention as specified in the petition by me presented to the Secretary of State praying that letters patent may issue for the same according to law.

Jacob Perkins

Witnesses
Sam^l Coates
Edw^d W Shoemaker

Photographic copy made from the original March 3, 1911.